(No Model.) 3 Sheets—Sheet 1.

W. A. LORENZ & W. H. HONISS.
PAPER BAG.

No. 329,661. Patented Nov. 3, 1885.

Witnesses:
Frank H. Pierpont
Albert W. Perry

Inventors:
William A. Lorenz
William H. Honiss
By Albert H. Walker Attorney.

N. PETERS, Photo-Lithographer, Washington, D. C.

(No Model.) 3 Sheets—Sheet 2.
W. A. LORENZ & W. H. HONISS.
PAPER BAG.
No. 329,661. Patented Nov. 3, 1885.
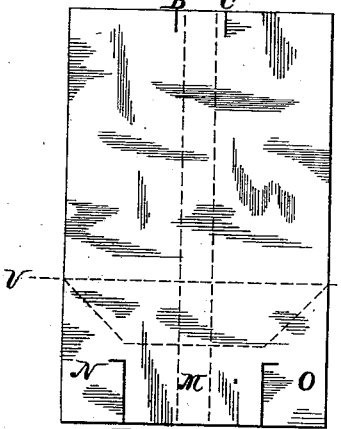
Fig. 10.
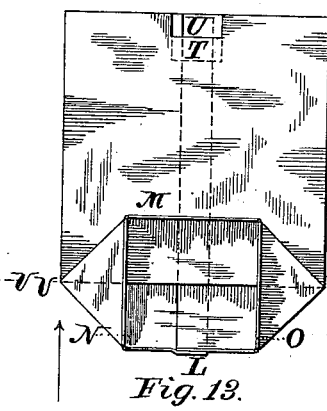
Fig. 12.
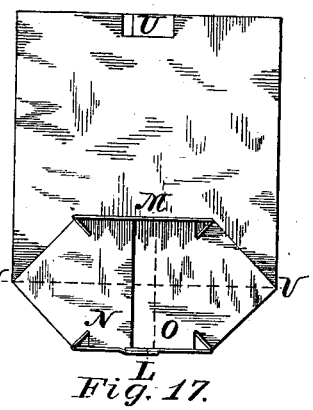
Fig. 14.
Fig. 11.
Fig. 13.
Fig. 17.
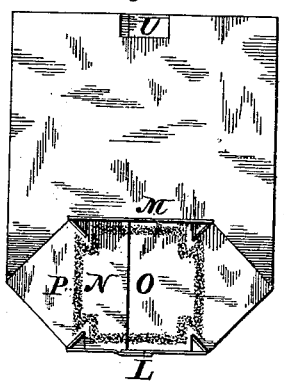
Fig. 15.
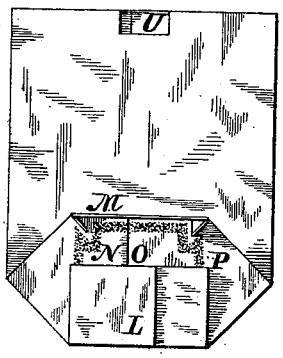
Fig. 16.
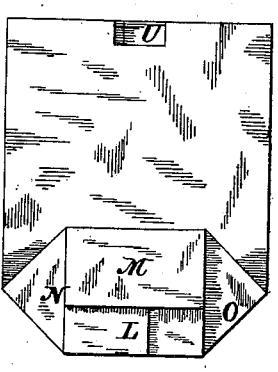
Fig. 18.
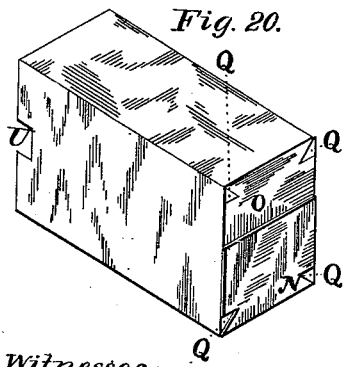
Fig. 20.
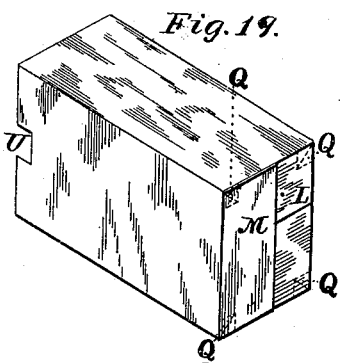
Fig. 19.
Witnesses:
Frank H. Pierpont
Wilbert W. Perry
Inventors:
William A. Lorenz
William H. Honiss
By Albert H. Walker Attorney.

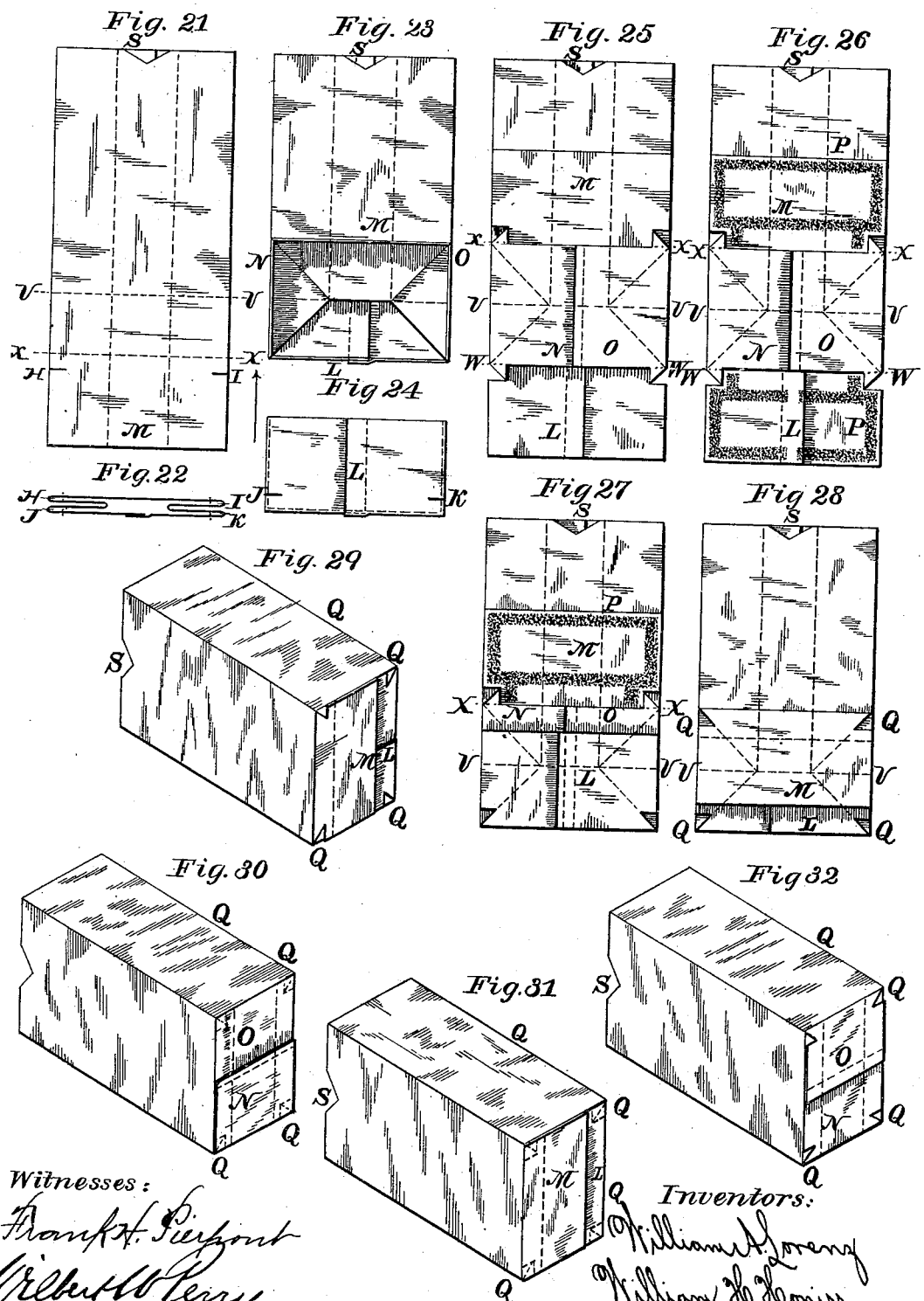

UNITED STATES PATENT OFFICE.

WILLIAM A. LORENZ AND WILLIAM H. HONISS, OF HARTFORD, CONNECTICUT, ASSIGNORS TO FELIX W. LEINBACH AND CLARENCE A. WOLLE, BOTH OF BETHLEHEM, PENNSYLVANIA.

PAPER BAG.

SPECIFICATION forming part of Letters Patent No. 329,661, dated November 3, 1885.

Application filed June 16, 1884. Serial No. 134,959. (No model.)

*To all whom it may concern:*

Be it known that we, WILLIAM A. LORENZ and WILLIAM H. HONISS, both of Hartford, Connecticut, have jointly invented certain new and useful Improvements in Paper Bags, of which the following description and claims constitute the specification, and which are illustrated by the accompanying three sheets of drawings.

These improvements consist of a generic process of making the bottoms of paper bags, and of several specific paper bags, each of which has a bottom made by a specific form of said generic process.

Figure 1:
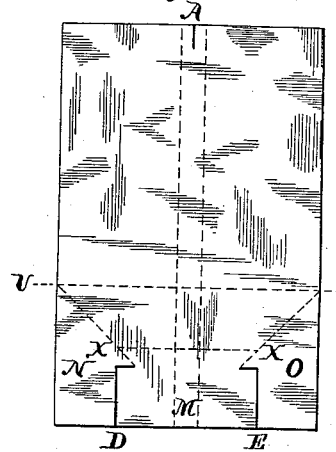
Figure 3:
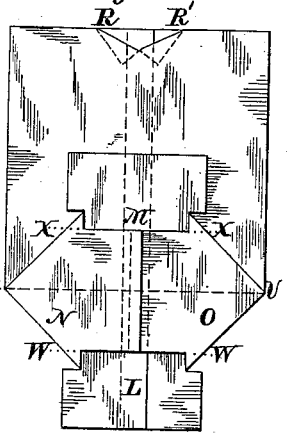
Figure 4:
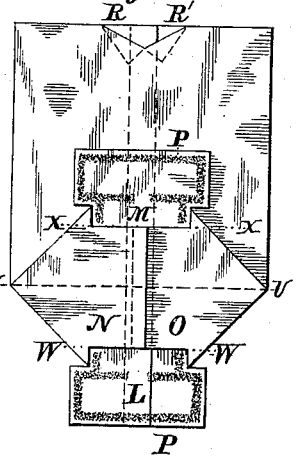
Figure 2:
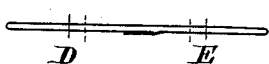
Figure 5:
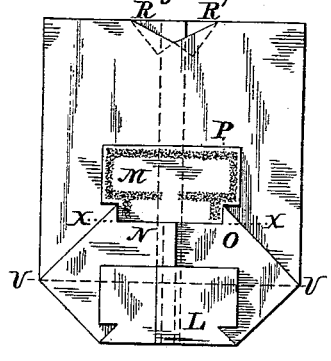
Figure 6:
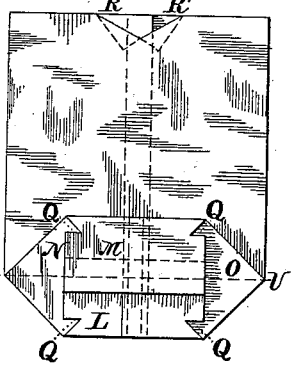
Figure 8:
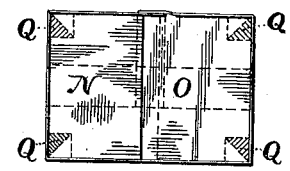
Figure 7:
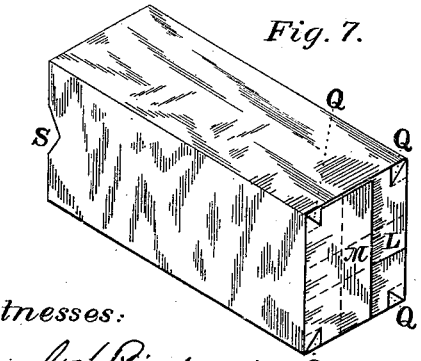
Figure 9:
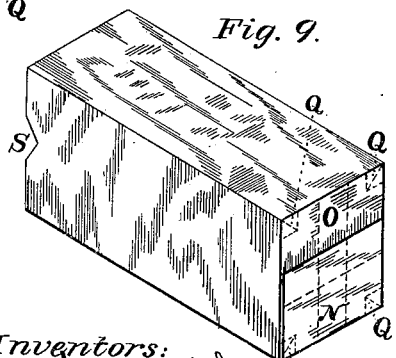

Figure 1 of the drawings is a plan view of a flat paper tube of suitable length to make a paper bag, and having slits cut therein preparatory to making a "satchel-bottom" paper bag having either of two specific forms of our improved bottom. Fig. 2 is a view of the lower end of the flat paper tube of Fig. 1. Fig. 3 is a view of the flat tube of Fig. 1, with the thumb-notch completed, and with the first fold in the process of making the bottom properly made. Fig. 4 is a view of the blank of Fig. 3, with paste applied to the upper and to the lower flap. Fig. 5 is a view of the blank of Fig. 4, with the lower flap folded over. Fig. 6 is a view of the blank of Fig. 5, with the upper flap folded down, and the bag thus completed. Fig. 7 is a perspective view of the bag of Fig. 6, opened out. Fig. 8 is a view of the inside of the bottom of the bag of Fig. 7. Fig. 9 is a perspective view of a second specific paper bag, made from the flat paper tube of Fig. 1, in a manner hereinafter described. Fig. 10 is a plan view of a flat paper tube of suitable length to make a paper bag, and having slits cut therein preparatory to making a satchel-bottom paper bag having either of two other specific forms of our improved bottom. Fig. 11 is a view of the lower end of the flat paper tube of Fig. 10. Fig. 12 is a view of the flat paper tube of Fig. 10, with the thumb-notch completed, and with the lower end of the tube opened up and folded, as hereinafter described. Fig. 13 is a view of the lower end of the blank of Fig. 12. Fig. 14 is a view of the blank of Fig. 12, with the side flaps folded down. Fig. 15 is a view of the blank of Fig. 14, with paste applied to the outer surfaces of the side flaps. Fig. 16 is a view of the blank of Fig. 15, with the lower flap folded over. Fig. 17 is a view of the blank of Fig. 16, with paste applied to the outer surface of the lower flap. Fig. 18 is a view of the blank of Fig. 17, with the upper flap folded down, and the third specific bag thus completed. Fig. 19 is a perspective view of the bag of Fig. 18 opened out. Fig. 20 is a perspective view of a fourth specific paper bag, made from the flat paper tube of Fig. 10, in the manner hereinafter described in that behalf. Fig. 21 is a plan view of a tucked paper tube of suitable length to make a paper bag, and having slits cut therein preparatory to making a "square-bottom" paper bag having either of two specific forms of our improved bottom. Fig. 22 is a view of the lower end of the tucked paper tube of Fig. 21. Fig. 23 is a view of the tucked paper tube of Fig. 21, with the lower end of the tube opened up, as hereinafter described. Fig. 24 is a view of the lower end of the blank of Fig. 23. Fig. 25 is a view of the blank of Fig. 23, with the side flaps folded down in their permanent places, and with the top and the bottom flap folded temporarily backward. Fig. 26 is a view of the blank of Fig. 25, with paste applied to the presented surfaces of the upper and lower flaps. Fig. 27 is a view of the blank of Fig. 26, with the lower flap folded down in its permanent place. Fig. 28 is a view of the blank of Fig. 27, with the upper flap folded down upon the lower flap, and the fifth specific bag thus completed. Fig. 29 is a perspective view of the bag of Fig. 28, opened up. Fig. 30 is a perspective view of a sixth specific bag, made from the tucked paper tube of Fig. 21, in a manner hereinafter described. Figs. 31 and 32 are perspective views of a seventh and an eighth specific bag, either of which may be made from a blank identical with that of Fig. 21, except that to make either of them the lateral slits of that blank must be cut into the adjacent parts of the tucks, instead of into the upper and lower sides of the tube.

A is a short longitudinal slit cut in the middle of the upper edge of one of the sides of the flat paper tube of Fig. 1.

B and C are short longitudinal slits cut in the upper edge of one of the sides of the flat paper tube of Fig. 10.

D and E are right-angled slits cut in the lower edge of both sides of the flat paper tube of Fig. 1.

F and G are right-angled slits cut in the lower edge of both sides of the flat paper tube of Fig. 10.

The longitudinal parts of the slits D, E, F, and G are on a line with the future corners, respectively, of the respective bags when opened out, as in Figs. 7, 9, 19, and 20. The lateral parts of the slits D and E extend toward each other; but the lateral parts of the slits F and G extend away from each other.

H, I, J, and K are right-angled slits cut in the lower edge of the tucked paper tube of Figs. 21 and 22. The longitudinal parts of these slits are in the convex folds of the tucks, as shown in Fig. 22, and are on a line with the future corners, respectively, of the bags when opened out, as shown in Figs. 29, 30, 31, and 32. The lateral parts of these slits extend from the inner ends of the longitudinal parts, respectively, and toward each other as far as the short dotted lines in Fig. 22.

L is the lower and M is the upper flap, while N and O are the side flaps of each of the several specific bags shown in the drawings.

P is the paste, which is applied to sundry of the flaps, as shown.

Q represents the only portions of the bottoms of the various bags where only one thickness of paper exists.

R and R' are the triangular folds of one form of thumb-notch, while S is that thumb-notch.

T is the quadrangular fold of another form of thumb-notch, while U is that notch.

The method of folding the bottom of the first specific bag is as follows: The upper flap, M, and the adjacent part of the flat paper tube of Fig. 1 are folded back on the line V V of Figs. 1, 3, 4, 5, and 6. At the same time the flaps N and O are folded on the four diagonal lines shown in Fig. 3. Paste is then applied to the presented surfaces of the flaps, substantially as shown in Fig. 4, and then the flap L is folded over on the line W W of Figs. 3 and 4 into the position shown in Fig. 5. Then the flap M is folded down on the line X X of Figs. 1, 3, 4, and 5 into the position shown in Fig. 6.

The method of folding the bottom of the second specific bag is as follows: The flaps L, M, N, and O of the flat paper tube of Fig. 1 are opened up into the box-like form shown in Figs. 12 and 13. Then the flaps L and M are folded down, one after the other, leaving the other sides of the box-like form standing. Paste is then applied to the presented surfaces of the flaps L and M. Then the flap O is folded down, and paste is applied to the border of its end. Then the flap N is folded down upon the other three flaps, and the bottom of the bag shown in Fig. 9 is thus completed, ready to be opened out into the form shown in that figure.

The method of folding the bottom of the third specific bag is as follows: The flaps L, M, N, and O of the flat paper tube of Fig. 10 are opened up into the box-like form shown in Figs. 12 and 13. Then the flaps N and O are folded down, one after the other, leaving the other sides of the box-like form standing, as shown in Fig. 14. Paste is then applied to the presented surfaces of the flaps N and O, as shown in Fig. 15. Then the flap L is folded down, as shown in Fig. 16, and paste is then applied to the border of its end, as shown in Fig. 17. Then the flap M is folded down upon the other three flaps into the position shown in Fig. 18.

The method of folding the bottom of the fourth specific bag is as follows: The flaps L, M, N, and O of the flat paper tube of Fig. 10 are opened up into the box-like form shown in Figs. 12 and 13. Then the flaps L and M and the flaps N and O are folded down, and paste is applied precisely as in the method of making the bottom of the second specific bag hereinbefore set forth.

The method of folding the bottom of the fifth specific bag is as follows: The flaps L, M, N, and O of the tucked paper tube of Fig. 21 are opened up into the box-like form shown in Figs. 23 and 24. Then the flaps N and O are folded down, one after the other, leaving the other sides of the box-like form standing. Then the flaps L and M are folded back, as shown in Fig. 25, and paste is applied to their presented surfaces, as shown in Fig. 26. Then the flap L is folded over on the line W W of Figs. 25 and 26 into the position shown in Fig. 27. Then the flap M is folded over on the line X X of Figs. 25 and 26 into the position shown in Fig. 28.

The method of folding the bottom of the sixth specific bag is as follows: The flaps L, M, N, and O of the tucked paper tube of Fig. 21 are opened up into the box-like form shown in Figs. 23 and 24. Then the flaps L and M are folded down, one after the other, leaving the other sides of the box-like form standing. Then paste is applied to the presented surfaces of the flaps L and M. Then the flap O is folded down, and paste is applied to the border of its end. Then the flap N is folded down upon the other three flaps, and the bottom of the bag shown in Fig. 30 is thus completed, ready to be opened out into the form shown in that figure.

The method of folding the bottom of the seventh specific bag is as follows: The flaps L, M, N, and O of a blank identical with that of Fig. 21, except in having the lateral parts of the slits H, I, J, and K cut into the adjacent parts of the tucks, instead of into the upper and lower sides of the paper tube, are opened up into the box-like form shown in Figs. 23 and 24. Then the flaps N and O are folded down, one after the other, leaving the other sides of the box-like form standing. Then paste is applied to the presented surfaces of the flaps N and O. Then the flap L is folded down, and paste is applied to the border of its end. Then the flap M is folded down upon the other three flaps, and the bottom of the bag shown in Fig. 31 is thus completed, ready to be opened out into the form shown in that figure.

The method of folding the bottom of the eighth specific bag is as follows: The flaps L, M, N, and O of a blank precisely like that used to make the seventh specific bag are opened up into the box-like form shown in Figs. 23 and 24. Then the flaps L and M are folded down, one after the other, leaving the other sides of the box-like form standing. Then paste is applied to the presented surfaces of the flaps L and M. Then the flap N is folded down, and paste is applied to the border of its end. Then the flap O is folded down upon the other three flaps, and the bottom of the bag shown in Fig. 32 is completed, and may be opened up into the form of that figure.

We claim as our joint invention—

1. The process of making the bottom of a paper bag, which consists in first cutting four angular slits in the lower edge of a paper tube, the longitudinal parts of which slits are respectively on a line with the future four corners of the body of the bag, respectively, and then in folding the four flaps thus made and pasting them in place in the manner particularly set forth in the foregoing description and illustrated in the accompanying drawings.

2. A paper bag the bottom of which is composed of four flaps, each of which is integral with the body of the bag, and all of which are formed by cutting four angular slits in the lower edge of a paper tube, the longitudinal parts of which slits are respectively on a line with the four corners of the body of the bag, respectively, and all of which flaps are folded and pasted in place in the manner particularly set forth in the foregoing description and illustrated in the accompanying drawings.

WILLIAM A. LORENZ.
WILLIAM H. HONISS.

Witnesses:
ALBERT H. WALKER,
FRANK H. PIERPONT.